United States Patent
Deckert et al.

(10) Patent No.: US 10,875,222 B2
(45) Date of Patent: Dec. 29, 2020

(54) PLASTIC MOULDED PART AND METHOD FOR THE PRODUCTION THEREOF

(71) Applicant: LEONHARD KURZ Stiftung & Co. KG, Furth (DE)

(72) Inventors: Klaus Deckert, Postbauer-Heng (DE); Martin Hahn, Herrieden (DE)

(73) Assignee: LEONHARD KURZ Stiftung & Co. KG, Furth (DE)

( * ) Notice: Subject to any disclaimer, the term of this patent is extended or adjusted under 35 U.S.C. 154(b) by 0 days.

(21) Appl. No.: 16/517,037

(22) Filed: Jul. 19, 2019

(65) Prior Publication Data

US 2019/0375139 A1   Dec. 12, 2019

Related U.S. Application Data

(62) Division of application No. 15/104,624, filed as application No. PCT/EP2014/077807 on Dec. 15, 2014, now Pat. No. 10,377,067.

(30) Foreign Application Priority Data

Dec. 18, 2013   (DE) ......................... 10 2013 114 276

(51) Int. Cl.
| | |
|---|---|
| *B29C 45/14* | (2006.01) |
| *B29K 101/12* | (2006.01) |
| *B29L 31/34* | (2006.01) |

(52) U.S. Cl.
CPC .. *B29C 45/14508* (2013.01); *B29C 45/14467* (2013.01); *B29C 2045/14532* (2013.01); *B29K 2101/12* (2013.01); *B29L 2031/3475* (2013.01)

(58) Field of Classification Search
CPC .............................................. B29C 45/14508
See application file for complete search history.

(56) References Cited

U.S. PATENT DOCUMENTS

| | | | |
|---|---|---|---|
| 4,965,037 | A | 10/1990 | Weaver et al. |
| 6,277,312 | B1 | 8/2001 | Hansen et al. |

(Continued)

FOREIGN PATENT DOCUMENTS

| | | |
|---|---|---|
| DE | 19702977 | 7/1998 |
| DE | 19758496 | 3/1999 |

(Continued)

OTHER PUBLICATIONS

"Laser Engraving"—Wikipedia, Oct. 23, 2013, XP055172261.

(Continued)

*Primary Examiner* — Larry W Thrower
(74) *Attorney, Agent, or Firm* — Hoffmann & Baron, LLP

(57) ABSTRACT

The invention relates to a method for producing a plastic molded part (1), comprising the steps of:
a) providing a first decorative film (11), which at least partially has an opaque coating (112);
b) introducing at least one decorative element of a decoration into the first decorative film (11) by machining using a machining tool;
c) providing a second decorative film (12);
d) placing the decorative films (11, 12) into an injection mold (2) having a first (21) and second mold half (22), which together form a cavity (23) for molding the plastic molded part (1), the first decorative film (11) being placed on a first wall (22f) of the cavity (23) and the second decorative film (12) on a second wall (21f) of the cavity (23) lying opposite the first wall (22f);
e) back-injecting the decorative films (11, 12) with a polymer melt, so that the first decorative film (11) forms a first surface and the second decorative film (12) forms a second surface of the plastic molded part (1) opposite the first surface.

13 Claims, 3 Drawing Sheets

(56) References Cited

U.S. PATENT DOCUMENTS

| | | |
|---|---|---|
| 6,416,844 B1 | 7/2002 | Robson |
| 7,976,931 B2 | 7/2011 | Schilling et al. |
| 2003/0122278 A1 | 7/2003 | Kosanvoich |
| 2004/0173940 A1 | 9/2004 | Yuhara et al. |
| 2007/0012771 A1 | 1/2007 | Singleton |
| 2011/0195224 A1 | 8/2011 | Zhang et al. |
| 2012/0038082 A1 | 2/2012 | Burger et al. |

FOREIGN PATENT DOCUMENTS

| | | |
|---|---|---|
| DE | 102004012937 | 10/2005 |
| DE | 102005006074 | 8/2006 |
| DE | 102007020308 | 10/2008 |
| DE | 102011050585 | 11/2012 |
| EP | 1413417 | 4/2004 |
| EP | 1743756 | 1/2007 |
| JP | S58122873 A | 7/1983 |
| JP | 2006095690 A | 4/2006 |
| JP | 2007216417 A | 8/2007 |
| WO | 2006057198 A1 | 6/2006 |
| WO | WO2010105780 | 9/2010 |
| WO | WO2012163677 | 12/2012 |

OTHER PUBLICATIONS

"The Gravure Printing Process—APPL Blog", Dec. 5, 2013, XP055172396.
"Achieving Design and Function in a Single Molding Cycle", Oct. 10, 2012, XP055172586.
"PolyIC Website", Apr. 30, 2012, XP055172576.

PLASTIC MOULDED PART AND METHOD FOR THE PRODUCTION THEREOF

This application is a divisional application of U.S. application Ser. No. 15/104,624, filed Jun. 15, 2016, which claims priority based on an International Application filed under the Patent Cooperation Treaty, PCT/EP2014/077807, filed on Dec. 15, 2014, and German Application No. DE 102013114276, filed on Dec. 18, 2013.

BACKGROUND OF THE INVENTION

The invention relates to a plastic molded part and to a method for the production thereof.

In order to create plastic molded parts with decorative surfaces, it is known to place decorative films into injection molds and to back-inject them with a polymer melt.

The surfaces of these molded parts are subject to high demands. In particular, they have to be resistant to substances with which they come into contact in daily use, such as for example fingerprints, nail varnish remover and the like, as well as having to resist mechanical loads as far as possible without scratching. The surfaces of these molded parts are also subject to high optical demands, and therefore the surface should have an optically high-quality and/or attractive appearance.

In order to achieve good resistance of the surfaces and/or a desired optical appearance of the surface, it is conventional to apply at least one protective lacquer coat on to the molded parts by means of wet coating after the polymer melt has cured. By means of this wet coating, further decorative elements can also be applied at the same time.

However, a coating step of this type makes the manufacture of the plastic molded part significantly more complex and cost-intensive. At the same time, it is not always possible to achieve the desired tolerances in positioning the decorative elements using this step.

SUMMARY OF THE INVENTION

The object of the present invention is to provide a plastic molded part and a method for the production thereof.

Such a method for producing a plastic molded part comprises the steps of:
a) providing a first decorative film, which is at least partially provided with an opaque coating;
b) introducing at least one decorative element of a decoration into the first decorative film by machining using a machining tool;
c) providing a second decorative film;
d) placing the decorative films into an injection mold having a first and second mold half, which together form a cavity for molding the plastic molded part, the first decorative film being placed on a first wall of the cavity and the second decorative film on a second wall of the cavity lying opposite the first wall;
e) back-injecting the decorative films with a polymer melt, so that the first decorative film forms a first surface and the second decorative film forms a second surface of the plastic molded part opposite the first surface.

Using a method of this type, a plastic molded part can be obtained, said part comprising a first decorative film, which at least partially has an opaque coating, into which a decoration is introduced, and comprising a second decorative film, the first decorative film forming a first surface and the second decorative film forming a second surface of the plastic molded part opposite the first surface.

In step b), the introduction of the at least one decorative element of a decoration into the first decorative film can take place in particular by laser irradiation and/or by milling and/or stamping. The machining tool is therefore preferably a laser, a milling tool and/or a stamping tool.

The two decorative films preferably form a protection for both surfaces of the plastic molded part, so that this is particularly resistant. A wet coating of the plastic molded part after the polymer melt has cured can therefore be omitted, and so the finished part is obtained directly. In the assembled state of the plastic molded part, the first decorative film preferably forms the back thereof, and so the optical quality of the opaque layer does not have to be excessively high. The important thing is only that the decoration introduced in particular by laser irradiation, milling or stamping, which is preferably subsequently backlit, is of high quality.

At the same time, through the combination of the two decorative films, a particularly high design freedom and precision is obtained. The two films preferably have decorative elements or design elements that supplement one another, e.g. complementary patterns, which for example supplement one another to form an overall design or an overall decoration when observed and/or backlit, and/or give an optically variable effect when observed from different angles.

The tolerances that can be achieved in introducing the design are in the range of +/−0.1 mm, whereas with alternative methods, for example the use of pre-stamped transfer films, tolerances of only +/−0.2 mm can be achieved for small parts and of only +/−1 mm for larger parts.

Furthermore, laser irradiation, milling or stamping is not bound to fixed designs. Thus, it is possible, for example, to manufacture individualized designs or highly flexible small series without any additional expense. The laser or milling head is electronically controlled here, with control signals controlling the position of the laser beam, milling head or stamping blade on the surface of the molded part. The control signals can be modified specifically to the parts, i.e. for each individual molded part or for a specific number of molded parts.

A stamping blade or punch is advantageous in particular when it is desired to introduce relatively large-area decorations or decorative elements and this introduction would take too long using a finely structuring tool such as a laser beam or milling head. The use of a stamping blade or punch is likewise expedient if the decoration or the decorative elements have repeating motifs of the same type, e.g. circles, dots, stars, symbols or letters.

Preferably, the decoration and/or the at least one decorative element is introduced into the first decorative film by laser irradiation, milling or stamping after the back injection. This makes it possible to place or position the decoration and/or the at least one decorative element particularly accurately, because important operational steps that disturb or negatively affect the placing and/or positioning of the decoration and/or of the at least one decorative element (in particular the positioning of the decorative films in the injection mold and the back injection) have already taken place.

Alternatively, however, it is also possible for the decoration and/or the at least one decorative element to be introduced into the first decorative film by laser irradiation, milling or stamping before the back injection and in particular before the first decorative film is placed into the injection mold.

Preferably, when the decoration and/or the at least one decorative element is introduced into the first decorative film by laser irradiation, milling or stamping, the opaque coating is at least partially removed in the area machined with the machining tool and/or the opacity of the opaque coating is reduced in the area machined with the machining tool.

The opaque coating can be accurately ablated by laser irradiation, milling or stamping so that symbols or other decorative elements to be backlit can be introduced in this way. Where the material of the opaque coating is hit by the laser beam here, it is heated and evaporated and, as a result, removed. In the case of milling or stamping, the material of the opaque coating is removed mechanically.

Suitable for this purpose are materials such as opaque colored-lacquer coats with high pigmentation, for example carbon black pigments, for example composed of pigments in a polymeric, generally transparent binder, the proportion and nature of the pigments determining the opacity of the lacquer, metal layers of aluminum, chromium or copper or the like. A metal layer of vapor-deposition-coated and cluster-forming tin as a non-conductive metal layer (so-called NCVM coats (NCVM=Non-Conductive Vacuum Metallization)) is likewise possible. Materials that change their optical properties during laser irradiation, in particular their opacity or transparency, can also be used as a material for the opaque coating.

For the laser irradiation an Nd:YAG laser is preferably employed, which in particular emits light in the infrared range. The necessary intensity of the laser beam depends on the nature and thickness of the opaque coating as well as on the rate at which the opaque coating is to be removed.

It has proved useful if the pigmentation of the colored lacquer layer is selected such that a pigment index PI is in the range of 1.5 cm³/g to 120 cm³/g, in particular in the range of 5 cm³/g to 120 cm³/g, the pigment index PI being calculated according to:

$$PI = \sum_{1}^{x} \frac{(m_P \times f)_x}{(m_B + m_A)} \text{ and } f = \frac{OA}{d},$$

wherein the following applies:
$m_P$=mass of a pigment in the colored lacquer layer in g,
$m_B$=constant; mass of a binder in the colored lacquer layer in g,
$m_A$=constant; mass of solids in the additives in the colored lacquer layer in g,
OA=oil absorption value of a pigment (according to DIN 53199),
d=density of a pigment (according to DIN 53193),
x=control variable, corresponding to the number of different pigments in the colored lacquer layer.

In this way, starting from a composition of a colored lacquer layer that has been found to be suitable, other possible pigmentations differing from this can be calculated rapidly in an uncomplicated manner.

It has proved advantageous if a pigmentation of the colored lacquer layer is selected such that a transmission T of visible light through the opaque coating is less than 50%. The transmission T, i.e. the transmittance of the opaque coating, is determined in particular with a spectrophotometer, for example of the Hitachi U-2000 type, measurements preferably being taken in a wavelength range of between 360 nm and 700 nm.

After the decoration and/or the at least one decorative element has been introduced into the first decorative film, the area machined with the machining tool and the area not machined with the machining tool preferably have a difference in transparency such that it is perceptible by a human observer without any aids when viewed with transmitted light. The difference in transparency here is in particular at least 5% and preferably at least 10% to 75%. This ensures that adequate contrast is present in the decoration, so that a sharply defined and readily perceptible decoration is obtained.

The opaque coating is applied preferably by printing, in particular screen printing or intaglio printing. The printing in this case can take place over the entire surface or part of the surface. It is also possible to perform multiple printing operations in succession in order to achieve the desired degree of coverage or the desired opacity. In this case, additional layers, such as, for example, colored transparent or translucent layers, protective lacquers or the like, can also be printed on at the same time over the entire surface or part of the surface.

Alternatively, the opaque coating can be applied using a transfer film. Here too, application can take place over the entire surface or part of the surface. A transfer film of this type typically comprises a carrier layer, an optional release layer and, as the transfer ply, one or more decorative layers, which can provide different degrees of coverage, and/or an adhesive layer. The carrier layer is removed after the application of the transfer film, the transfer ply remaining on the decorative film with the other layers. The opaque coating is then formed by at least one of the decorative layers and consists of the materials already mentioned.

Before the decoration is introduced, the opaque coating preferably has a transparency in the wavelength range visible to humans of less than 50%, in particular of less than 20%, preferably less than 5%. This provides a background of dark appearance, which offers a good contrast for subsequent backlighting.

It is also expedient if, after the decoration has been introduced, the opaque coating has a transparency in the wavelength range visible to humans of more than 50%, in particular of more than 75%, in the area machined with the machining tool. This allows a readily perceptible backlighting effect to be obtained. The transparency can also vary at different wavelengths visible to humans, so that colored backlighting is obtained.

The opaque coating preferably has a layer thickness of less than 100 μm, in particular in a layer thickness of between 5 μm and 50 μm. This ensures on the one hand the necessary opacity and on the other hand the production of a thin and optionally flexible plastic molded part.

It is furthermore preferred if the first decorative film has at least one further at least partial coating, in particular a transparent or translucent colored coating, a protective lacquer coating and/or an adhesive coating. These coatings can be applied by printing or using a transfer film as explained above. Combinations of these techniques are also possible. As a result, additional visual effects can be achieved or additional functions integrated into the decorative film.

The decoration and/or the at least one decorative element preferably is or comprises a logo, a symbol and/or at least one alphanumeric character. These elements can also be combined with abstract graphic design elements as decorative elements. The decoration can possess a purely ornamental function, but can preferably also be functional and, for example, denote display or control elements of a device, such as status displays, control surfaces or the like.

Preferably, at least one further decorative element is introduced into the first decorative film by stamping. This allows large-area recesses to be provided for display elements, for backlighting or the like, without the need for a lengthy laser treatment or milling treatment of these areas.

It is further preferred if the first decorative film is deep-drawn before being placed into the injection mold. This enables so-called inserts to be produced, which can in particular be shaped three-dimensionally before back injection to a greater extent than is often possible during back injection.

Conventional deep-drawing methods can be used here. In general, the first decorative film is provided as sheet stock and placed into a deep-drawing mold, which has the desired finished contours. By applying heat, preferably a temperature of 80° C. to 200° C., the decorative film is rendered deformable. The film can now be adapted to the shape of the deep-drawing mold and thus brought into the desired finished contours by applying a vacuum and/or by applying a forming die and/or positive air pressure. Upon cooling, the material of the first decorative film then hardens again, so that said film retains the finished contours.

After deep-drawing, mechanical finishing can optionally also take place, for example by cutting (mechanically or using a laser), milling, stamping or the like.

The first decorative film in this case preferably has a thickness of 50 µm to 2000 µm. This on the one hand ensures good mechanical stability and on the other hand allows problem-free shaping.

The first decorative film preferably has at least one ply composed of a colorless or colored transparent or translucent thermoplastic material, in particular of ABS, ABS/PC, PC/ABS, PC, PP or PMMA. This serves as a carrier for the opaque coating and any further layers that may be present, but can itself be backlit. Because of the thermoplastic nature of the named materials, problem-free forming is possible.

It is further preferred if the at least one decorative element and/or decoration that has been introduced comprises at least one line having a line thickness of at least 50 µm, in particular of at least 0.5 mm. These lines can be part of the above-mentioned decorative elements or can form these, i.e. for example letters, symbols or logos. The minimum line thickness is determined by the resolving power and perceptive ability of the eye. Because of the backlighting, even extremely fine lines are still perceptible. The maximum line thickness or maximum extent of the decorative elements is limited only by the nature of the decorative elements.

It is also expedient if the second decorative film comprises a carrier layer, an optional release layer and at least one decorative ply that can be detached therefrom and that the carrier layer is removed from the decorative ply after the back injection. It is therefore a transfer film, as has already been described with reference to the application of the opaque coating on to the first decorative film. The carrier layer can also remain on the plastic molded part until the plastic molded part is installed, thus providing additional protection of the surface during handling.

Alternatively, the second decorative film can be formed in a similar manner to the first decorative film. To this end, the second decorative film preferably has at least one ply composed of a colorless or colored transparent or translucent thermoplastic material, in particular of ABS, ABS/PC, PC/ABS, PC, PP or PMMA. This serves as a carrier for the decorative ply of the second decorative film.

In this alternative embodiment of the second decorative film, as for the first decorative film, it is advantageous if the second decorative film is deep-drawn before being placed into the injection mold. This enables so-called inserts to be produced, which can in particular be shaped three-dimensionally before back injection to a greater extent than is often possible during back injection.

Conventional deep-drawing methods can be used here. In general, the second decorative film is provided as sheet stock and placed into a deep-drawing mold, which has the desired finished contours. By applying heat, preferably a temperature of 80° C. to 200° C., the decorative film is rendered deformable. The film can now be adapted to the shape of the deep-drawing mold and thus brought into the desired finished contours by applying a vacuum and/or by applying a forming die and/or positive air pressure. Upon cooling, the material of the second decorative film then hardens again, so that said film retains the finished contours.

The decorative ply of the second decorative film preferably comprises at least one protective lacquer coat which is high-gloss or matt and/or has been provided with a tactile structure. The protective lacquer coat here can be colorless or colored translucent or transparent or can also have opaque areas. In particular, it is preferred if the decorative ply forms a further decoration, which interacts with the at least one decorative element and/or decoration of the first decorative film.

Preferably, in order to form the tactile structure during back injection, in particular a tactile surface relief is molded into the surface of the second decorative film facing away from the polymer melt, in particular based on a pattern layer, which is disposed between the wall of the cavity and a carrier film of the second decorative film or the second decorative film.

The tactile structure is thus formed during injection molding, when the second decorative film is capable of plastic deformation because of the heat and pressure of the injected polymer melt. The pattern layer can be formed directly by the wall of the cavity or can preferably be provided by a separate insert, in particular by the carrier film itself.

The second decorative film is preferably transparent or translucent at least in some areas and in particular has a transparency of 5% to 100%. In this way, the backlit at least one decorative element and/or decoration of the first decorative film can also be readily perceived from the side of the second decorative film.

It is preferred if the decorative films are placed into the injection mold with a spacing of 0.5 mm to 10 mm, preferably of 0.8 mm to 5 mm. This spacing determines the wall thickness of the finished plastic molded part.

It is further preferred if at least one core is introduced into the injection mold between the decorative films. This enables hollows or recesses to be introduced into the plastic molded part, which can be used to hold functional elements, for example separate components such as displays, switches, controls or separate backlighting devices and/or touch sensors or the like. The core is preferably introduced into the space between the decorative films through a cut-out in the first decorative film.

Furthermore, it is possible that after the back injection, at least one functional element, in particular a backlighting device and/or a touch sensor, is applied, in particular bonded or laminated, on the side of the plastic molded part formed by the first decorative film. The functional element can additionally or alternatively comprise electrical wires and/or electrical/electronic components.

The first and/or second decorative film itself can preferably also comprise one or more electrical functional layers, comprising in particular a backlighting device or one or more touch sensors, in particular capacitive touch sensors.

Various functional elements can be integrated into the plastic molded part by any of the methods described, so that said part can be used as a control device, display element or the like.

Furthermore, the injection-molding compound is preferably transparent or translucent, in particular with a transparency of 5% to 98%, preferably composed of one of the following materials: ABS (acrylonitrile-butadiene-styrene copolymer), PC (polycarbonate), ABS/PC, PC/ABS, PMMA (polymethyl methacrylate), PP (polypropylene), PA (polyamide) and TPU (thermoplastic polyurethane).

This can ensure good backlighting of the plastic molded part. To process the named materials, injection molding at preferred temperatures of 200° C. to 300° C. is suitable. The necessary injection pressure depends in particular on part size, part geometry and wall thickness and can vary within a wide range.

In particular by varying the transparency of the second decorative film and/or the injection-molding compound and/or the contrast (difference in transparency) in the first decorative film, very different optical effects can be created.

For example, the contrast in the first decorative film can be adjusted to be very high by a highly transparent first carrier film and complete removal of the very low-transparency opaque coating. When a likewise highly transparent injection-molding compound is used, the visibility of the decorative elements can be controlled with the aid of the transparency of the second decorative film. If the second decorative film is likewise highly transparent, there is very clear visibility of the decorative elements because the contrast established in the first decorative film is also still readily visible through the second decorative film. If the second decorative film is less transparent, the visibility of the decorative elements can be reduced and at the same time an impression of very high opacity of the second decorative film can be created in the non-backlit state. Only in the backlit state can it then be perceived that the second decorative film is not actually opaque but translucent or transparent.

However, it is also possible to reduce the transparency and/or contrast of the first decorative film and its decorative elements and/or of the injection-molding compound. The transparency of the second decorative film then only partially determines how strongly or clearly the decorative elements can be seen through it.

BRIEF DESCRIPTION OF THE DRAWINGS

Exemplary embodiments of such a plastic molded part and methods for the production thereof are explained in more detail below with reference to the drawing. There are shown in.

DETAILED DESCRIPTION OF THE INVENTION

Figure 1:
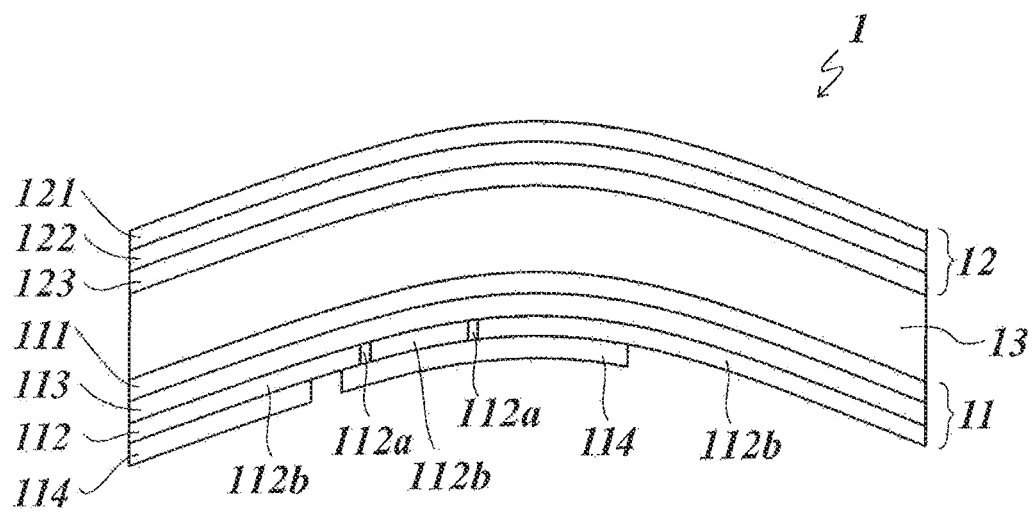
FIG. 1 A schematic sectional illustration through an exemplary embodiment of a plastic molded part with a decorative film on the front and on the back.

A plastic molded part 1, in particular for a control surface or display surface of a device, comprises a first decorative film 11, a second decorative film 12 and a base element 13, wherein the decorative films 11 and 12 are disposed on opposite sides of the base element 13. In a subsequent installed position of the plastic molded part 1, the first decorative film 11 forms the back thereof and the second decorative film 12 the front thereof, facing a user.

The first decorative film 11 has a multilayer construction and comprises at least one carrier ply 111 and an opaque coating 112. The carrier ply 111 preferably has a layer thickness of 50 µm to 2000 µm, in particular of 100 µm to 1000 µm, and consists of a transparent or translucent thermoplastic polymer, in particular of ABS, ABS/PC, PC/ABS, PC, PP or PMMA, PA or TPU.

The opaque coating 122 consists of an opaque lacquer, for example one or more opaque colored lacquer layers having a high content of pigments, for example carbon black pigments, and/or of a metal such as aluminum or copper or the like. The opaque coating 122 can preferably be applied by printing, in particular screen printing or intaglio printing. The printing in this case can take place over the entire surface or part of the surface. It is also possible to perform multiple printing operations in succession in order to achieve the desired degree of coverage or the desired opacity. In this case, additional layers 113, such as for example colored transparent or translucent layers, protective lacquers or the like, can also be printed on at the same time over the entire surface or part of the surface.

Alternatively, the opaque coating 112 can be applied using a transfer film. Here too, application can take place over the entire surface or part of the surface. A transfer film of this type typically comprises a carrier layer, an optional release layer and a transfer ply detachable therefrom having one or more decorative layers 113, which can provide different degrees of coverage, and/or an adhesive layer. The carrier layer is removed after the transfer ply has been applied on to the decorative film 11, the other layers 112, 113 remaining on the decorative film 11.

Figure 2:
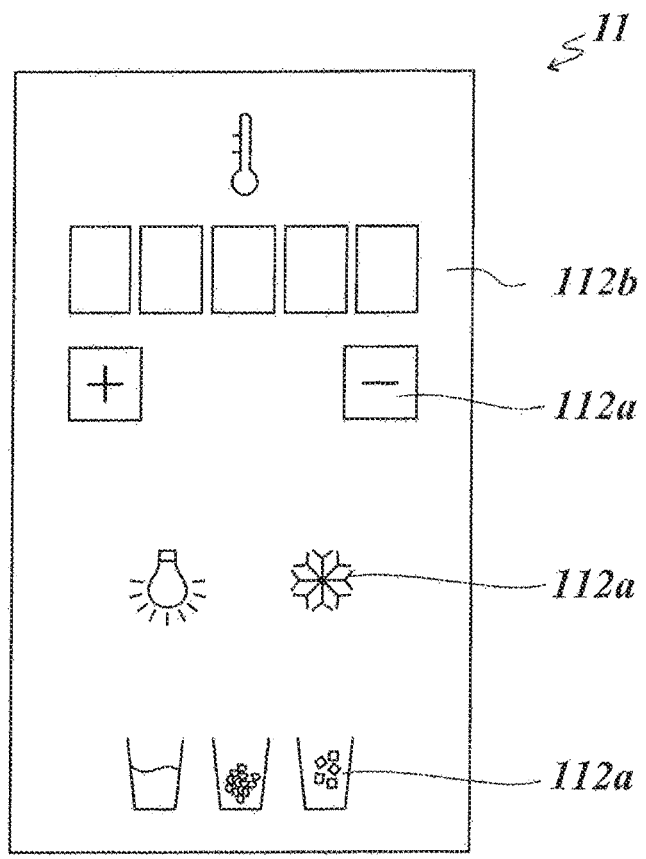
FIG. 2 A schematic view of a decorative film for a plastic molded part according to FIG. 1.

By laser irradiation, milling or stamping, the opaque coating 112 can be removed accurately from the decorative film 11, so that symbols or other decorative elements to be backlit can be introduced in this way. An example of such a decoration is shown in FIG. 2. Here, the material of the opaque coating 112 is heated and evaporated in the areas 112a where it is hit by the laser beam and is thereby removed. In the case of milling or stamping, the material of the opaque coating 112 is removed mechanically in the areas 112a.

It is also possible to use materials that change their optical properties, in particular their opacity or transparency, during laser irradiation, for example special bleachable pigments or pigments that display a color change by means of suitable laser irradiation.

For the laser irradiation an Nd:YAG laser is preferably employed, which in particular emits light in the infrared range. The necessary intensity of the laser beam depends on the nature and thickness of the opaque coating as well as on the rate at which the opaque coating is to be removed.

The areas 112a machined with the machining tool preferably form lines having a line thickness of at least 50 µm, in particular of at least 0.5 mm, which form decorative elements such as letters, numbers, symbols or logos. The minimum line thickness is determined by the resolving power and perceptive ability of the eye. As a result of the backlighting, even extremely fine lines are still perceptible. The maximum line thickness or maximum extent of the decorative elements is limited only by the nature of the decorative elements.

After the decoration has been introduced into the first decorative film 11, the areas 112a machined with the machining tool and the areas 112b not machined with the machining tool preferably have a difference in transparency of at least 10%, preferably of 20% to 75%. This ensures that adequate contrast is present in the decoration so that a sharply defined and readily perceptible decoration is obtained.

Before the introduction of the, the opaque coating 112 preferably has a transparency in the wavelength range visible to humans preferably of less than 50%, in particular of less than 20%, preferably less than 5%. This provides a background of dark appearance, which offers a good contrast for subsequent backlighting.

After the decoration has been introduced, the opaque coating 112 has a transparency in the wavelength range visible to humans of more than 50%, in particular of more than 75%, in the area 112a machined with the machining tool. This allows a readily perceptible backlighting effect to be obtained. The transparency can also vary at different wavelengths visible to humans, so that colored backlighting is obtained.

The opaque coating 112 preferably has a layer thickness of less than 100 μm, in particular in a layer thickness of between 5 μm and 50 μm. This ensures on the one hand the necessary opacity and on the other hand the production of a thin and optionally flexible plastic molded part. Overall, the first decorative film 11 preferably has a layer thickness of 50 μm to 2000 μm.

On the back of the first decorative film 11, further functional elements 114 can also be applied. These can be in particular a backlighting device or one or more touch sensors, in particular capacitive touch sensors. The decorative film 11 itself can also comprise one or more electrical functional layers comprising in particular a backlighting device or one or more touch sensors, in particular capacitive touch sensors.

The second decorative film 12 in the embodiment as a transfer film comprises a carrier layer 121, an optional release layer and at least one decorative ply 122, 123. The carrier layer 121 is removed from the decorative ply 122, 123 after the application of the second decorative film 12. Carrier layer 121 and release layer are therefore no longer present in the finished component. However, the carrier layer 121 can also, as shown in FIG. 1, remain on the plastic molded part 1 until the plastic molded part 1 is installed, thus providing additional protection of the surface during handling.

The carrier layer 121 preferably consists of PET (polyethylene terephthalate) or PMMA or PC and has a layer thickness of 6 μm to 50 μm.

In the alternative embodiment as in particular a deep-drawn insert, the carrier layer 121 of the second decorative film 12 has a layer thickness preferably of 50 μm to 2000 μm, in particular of 100 μm to 1000 μm, and consists of a transparent or translucent thermoplastic polymer, in particular of ABS, ABS/PC, PC/ABS, PC, PP or PMMA, PA or TPU. The carrier layer 121 in this case has no release layer and serves as a carrier for the decorative ply 122, 123.

The at least one decorative ply 122, 123 comprises at least one protective lacquer coat 122 which is high-gloss or matt and/or has been provided with a tactile structure, for example a brushed surface. The surface effects in this case can also be partially present or can form adjacent surfaces. The protective lacquer coat 122 can be colorless or colored translucent or transparent or can have opaque areas.

The protective lacquer of the protective lacquer coat 122 here is preferably a radiation-cured lacquer, such as for example a physically drying binder system based on polyacrylic and PU resins, which can be cured to completion after the plastic molded part 1 is completed. This takes place preferably by irradiation at a wavelength of 200 nm to 400 nm.

The second decorative film 12 is preferably transparent or translucent at least in some areas and in particular has a transparency of 20% to 100%. In this way, the backlit at least one decorative element and/or decoration of the first decorative film 11 can also be readily perceived from the side of the second decorative film 12.

Overall, the layer thickness of the second decorative film 12 in the embodiment as a transfer film is preferably approximately 10 μm to 100 μm, with the decorative plies 122, 123 preferably each having a layer thickness of 1 μm to 50 μm. In the embodiment as an insert, the total layer thickness of the second decorative film 12 is preferably approximately 50 μm to 2000 μm, with the decorative plies 122, 123 each having a layer thickness of 1 μm to 50 μm.

Furthermore, the decorative ply 122, 123 can form a further decoration, which interacts with the decoration of the first decorative film 11. For example, the two decorative films 11, 12 can each exhibit patterns which, when superimposed, display the desired final decoration. It is also possible to utilize the spacing between the decorative films 11, 12, for example to create an optically variable design by means of parallax effects.

The base element 13 is preferably made of a transparent or translucent thermoplastic polymer, preferably acrylonitrile-butadiene-styrene copolymer (ABS), polycarbonate (PC), polypropylene (PP), polymethyl methacrylate (PMMA) or a mixture of polycarbonate and acrylonitrile-butadiene-styrene copolymer (PC/ABS).

The transparency of the base element 13 is preferably from 5% to 98%. The layer thickness of the base element 13 is preferably 0.5 mm to 10 mm, preferably from 0.8 mm to 5 mm. Furthermore, hollows or recesses can also be introduced into the base element 13, into which further functional elements, such as displays or sensors, can be integrated.

Figure 3:
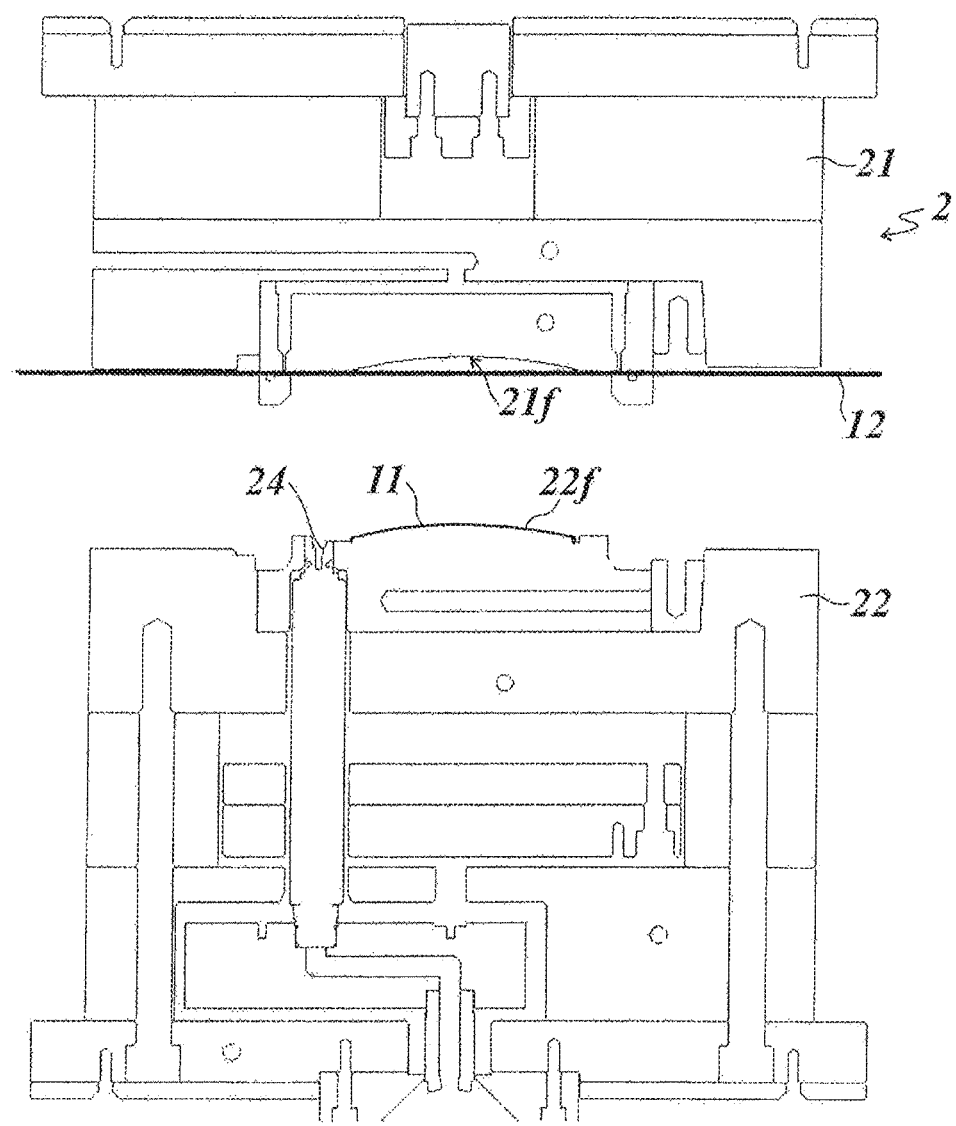
FIG. 3 A schematic sectional view through an injection molding tool in the opened state.

The production of the plastic molded part 1 takes place by injection molding. FIG. 3 shows a schematic sectional illustration of an injection-molding device 2 having a first mold half 21 and a second mold half 22. The first mold half 21 is designed to be movable relative to the fixed second mold half 22. The two mold halves have molding surfaces 21f and 22f, which form a cavity 23.

Figure 4:
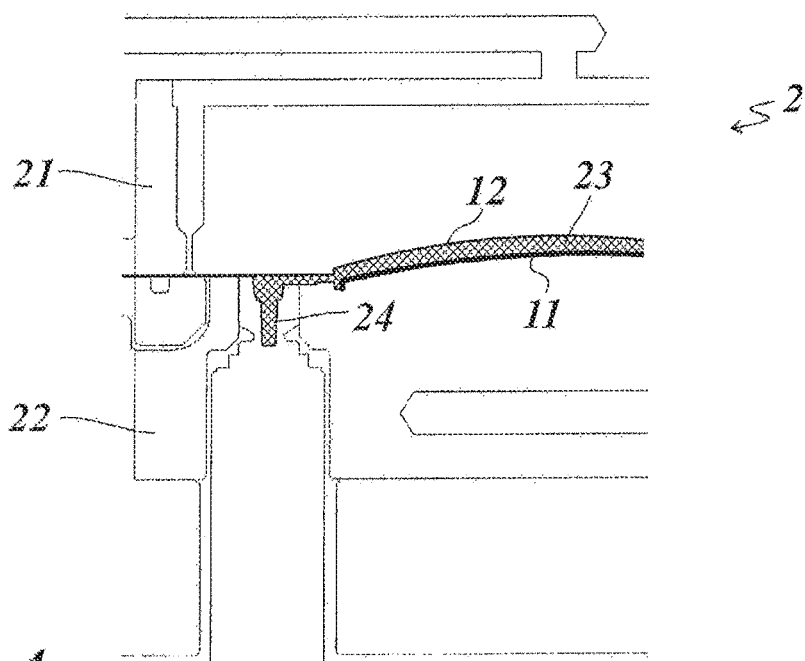
FIG. 4 A schematic sectional view through the injection molding tool according to FIG. 3 in the closed state.

In the exemplary embodiment illustrated in FIGS. 3 and 4, the molding surface 21f has in part a negative curvature, i.e. a concave design. The molding surface 22f has in part a positive curvature, i.e. a convex design. When the injection mold 2 is closed, the cavity 23 for a liquefied thermoplastic polymer melt, which can be introduced via a runner 24, is formed between the two molding surfaces 21f and 22f, the molding surfaces 21f and 22f defining the external contours of a decorated molded part 1 that can be produced in this way.

The second decorative film 12 is placed into the first mold half 12. The first decorative film is placed into the mold half 11 on the core side. The second decorative film 12 in this embodiment is provided as a transfer film and thus as a continuous material and can be fed through the injection-molding device 2 using a film feed unit (not shown). The film feed unit can comprise a supply roll for the second decorative film 12, a take-up roll for the residual film, i.e. for the optionally removed carrier layer 121 and residues of the decorative layer remaining on the carrier layer 121, a transport unit for the stepwise transport of the second decorative film 12 and a fixing device for fixing the second decorative film 12 on the first mold half 21.

The first decorative film 11 is provided as an inserted part, i.e. as a so-called insert, and is placed into the second mold half. For this purpose, the first decorative film 11 is pre-formed in a deep-drawing process, in particular thermally, and stamped out. This prior thermal forming is not absolutely necessary. The subsequent edge trimming can take place for example by stamping, milling, laser cutting or water jet cutting. The technically demanding method is suitable for continuous decorations on decorative films 11 that have been subjected to a high degree of three-dimensional forming. Apart from standard decorations, special degrees of gloss, a greater depth effect and abrasion resistances are possible with an additional finishing step.

The first decorative film 11 can be fixed on the molding surface 22f by positioning pins and/or the effect of electrostatic force and/or vacuum force. The outlet of the runner 13 is positioned such that the polymer melt can enter between the two decorative films 11, 12 and is materially bonded to the two decorative films 11, 12, thus forming the base element 13.

FIG. 4 shows the injection-molding device 2 with injected polymer melt. The two decorative films 11, 12 are now pressed against the respective molding surfaces 21f, 22f and are materially bonded with the injected polymer melt. The polymer melt can be a thermoplastic polymer or a thermoplastic polymer mixture, for example acrylonitrile-butadiene-styrene copolymer (ABS), polycarbonate (PC), polypropylene (PP), polymethyl methacrylate (PMMA) or a mixture of polycarbonate and acrylonitrile-butadiene-styrene copolymer (PC/ABS).

The above-mentioned plastics can also be used as a material for the carrier layer 111 of the first decorative film 11. Not all material combinations are suitable here. They must be material combinations which
a) form an injection-molded bond with one another
b) can be produced as plastic films that are capable of being deep-drawn.

Suitable combinations of the polymer melt and the carrier layer 111 are compiled in Table 1:

| Polymer melt | Carrier layer |
| --- | --- |
| Acrylonitrile-butadiene-styrene copolymer (ABS) | ABS |
| ABS/polycarbonate (PC) | ABS |
| PC/ABS | ABS |
| PC | PC |
| Polypropylene (PP) | PP |
| Polymethyl methacrylate (PMMA) | PMMA |

Preferred processing temperatures here are 200° C. to 300° C. The necessary injection pressure depends in particular on part size, part geometry and wall thickness and can vary within a wide range.

During injection molding, in particular a tactile surface relief can be molded into the surface of the second decorative film 12 facing away from the polymer melt, in particular based on a pattern layer disposed between the side of the carrier film 121 facing away from the decorative ply 122 and the wall 21f of the cavity 23.

The tactile structure is therefore formed during injection molding when the second decorative film 12 is capable of plastic deformation because of the heat and pressure of the injected polymer melt. The pattern layer in this case can be formed directly by the wall 21f of the cavity or can be provided by a separate insert, in particular by the carrier film 121 itself.

During injection molding, furthermore, at least one core can be introduced into the cavity 23 between the decorative films 11, 12. This enables hollows or recesses to be introduced into the plastic molded part 1, which can be used to hold functional elements, for example switches, controls, backlighting devices, separate display devices and/or touch sensors or the like. The core is preferably introduced into the space between the decorative films 11, 12 through a cut-out in the first decorative film 11.

After the injection molding, a mechanical finishing can also take place, in which the plastic molded part is trimmed, milled, polished or the like. This finishing can also take place manually. Furthermore, the functional parts 114 can also be mounted on the first decorative film here, in particular by bonding or laminating.

Figure 5:
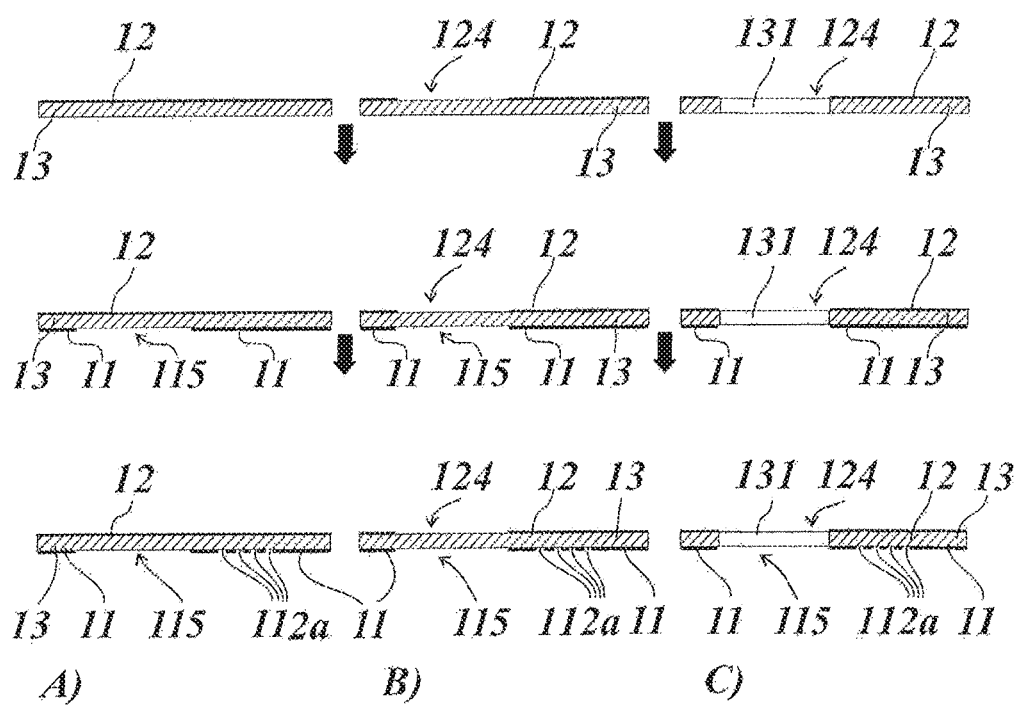
FIG. 5 A schematic illustration of various design variants of a plastic molded part.

In FIG. 5, again multiple design variants of plastic molded parts 1 are presented together for comparison purposes.

In the variant according to FIG. 5A, the second decorative film 12 is applied over the entire surface and has a continuous design. The second decorative film 12 is dark translucent and matt here. The first decorative film 11 has a cut-out 115, into which for example a display can be inserted. In the areas where the first decorative film 11 is present, the desired decorative elements or the desired decoration is/are in turn introduced by means of laser, milling or stamping. In addition, the decorative film 11 can be positively held on the molding surface 22f by means of a lug provided there and engaging in the recess 115. This can increase the positional accuracy of the decorative film 11 in the cavity 23, in particular in the case of large-area decorative films 11.

In the variant according to FIG. 5B, the second decorative film 22 also has a cut-out 124, which overlies the cut-out 115 of the first decorative film 11. The second decorative film 22 does not have a continuous design here but comprises an individual image, which supplements the at least one decorative element and/or decoration of the first decorative film 11.

In the variant according to FIG. 5C, the second decorative film 22 likewise has a cut-out 124, which overlies the cut-out 115 of the first decorative film 11. However, the second decorative film 22 here is again a black translucent, matt continuous design. In the base element 13 itself here, a recess 131 for a display device is provided, which can be introduced in the manner described above by using a core during injection molding.

The invention claimed is:

1. A plastic molded part comprising a first decorative film, which at least partially has an opaque coating, into which at least one decorative element of a decoration is introduced by machining using a machining tool, and comprising a second decorative film, wherein the first decorative film forms a first surface and the second decorative film forms a second surface, the first surface forming a back of the plastic molded part and the second surface forming a front of the plastic molded part opposite the first surface, wherein the plastic molded part further comprises at least one backlighting device and/or a touch sensor applied on the back of the plastic molded part formed by the first decorative film, and wherein, by the introduction of the at least one decorative element into the first decorative film by machining using the machining tool, the opaque coating is at least partially removed in the area machined using the machining tool and/or the opacity of the opaque coating is reduced in the area machined using the machining tool, and wherein the opaque coating has a transparency in the wavelength range visible to humans of less than 50%, and wherein, through the introduction of the at least one decorative element into the first decorative film, the area machined using the machining tool and the area not machined using the machining tool have a difference in transparency of at least 5%, and wherein the at least one decorative element of a decoration introduced using the machining tool comprises at least one line having a line thickness of at least 50 μm, and wherein the second decorative film is transparent or translucent at least in some areas and has a transparency of 5% to 100%.

2. The plastic molded part according to claim 1, wherein the opaque coating has a transparency in the wavelength range visible to humans of less than 20% in the area not machined using the machining tool.

3. The plastic molded part according to claim 1, wherein the opaque coating has a layer thickness of between 5 μm and 50 μm.

4. The plastic molded part according to claim 1, wherein the first decorative film has at least one further transparent or translucent colored coating, a protective lacquer coating and/or an adhesive coating.

5. The plastic molded part according to claim 1, wherein the at least one decorative element is or comprises a logo, a symbol and/or at least one alphanumeric character.

6. The plastic molded part according to claim 1, wherein at least one further decorative element of the decoration is introduced into the first decorative film by stamping.

7. The plastic molded part according to claim 1, wherein the first decorative film has a thickness of 50 to 2000 μm.

8. The plastic molded part according to claim 1, wherein the first decorative film has at least one ply comprising of a colorless or colored transparent or translucent thermoplastic material.

9. The plastic molded part according to claim 1, wherein the second decorative film comprises at least one protective lacquer coat which is high-gloss or matt and/or has been provided with a tactile structure and/or a tactile surface relief in the surface of the second decorative film facing away from the polymer melt.

10. The plastic molded part according to claim 1, wherein the plastic molded part has a layer thickness of 0.5 mm to 10 mm.

11. The plastic molded part according to claim 1, wherein the first and/or second decorative film has one or more electrical functional layers, comprising one or more capacitive touch sensors.

12. The plastic molded part according to claim 1, wherein the second decorative film has a carrier layer, an optional release layer and at least one decorative ply, wherein the decorative ply comprises at least one protective lacquer coat which is high-gloss or matt and/or has been provided with a tactile structure, and wherein the carrier layer is removed from the decorative ply after the back injection.

13. The plastic molded part according to claim 1, wherein the injection-molding compound is formed from one of the following materials: ABS (acrylonitrile-butadiene-styrene copolymer), PC (polycarbonate), ABS/PC, PC/ABS, PMMA (polymethyl methacrylate), PP (polypropylene), PA (polyamide), TPU (thermoplastic polyurethane).

* * * * *